Figure 1:
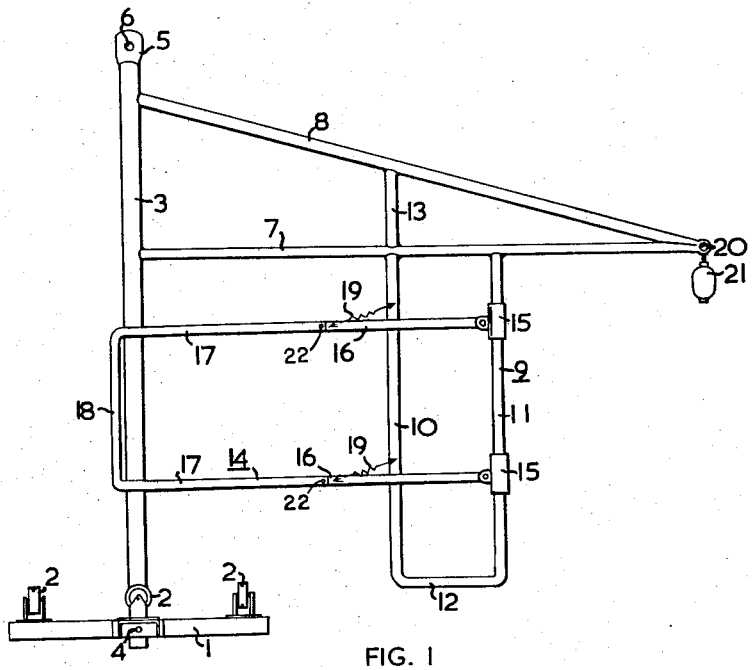

March 29, 1966     L. H. J. COOK ETAL     3,243,141
WIRE OR CABLE STRINGING DEVICE Filed Jan. 2, 1964

March 29, 1966  L. H. J. COOK ETAL  3,243,141
WIRE OR CABLE STRINGING DEVICE

Filed Jan. 2, 1964  3 Sheets-Sheet 2

Inventors
Lionel Henry James Cook
Jack Cobleng
By Cushman, Darby & Cushman
Attorneys March 29, 1966  L. H. J. COOK ETAL  3,243,141
WIRE OR CABLE STRINGING DEVICE Filed Jan. 2, 1964  3 Sheets-Sheet 3

Inventors
Lionel Henry James Cook
Jack Coblenz
By Cushman, Darby & Cushman
Attorneys United States Patent Office 3,243,141
Patented Mar. 29, 1966

3,243,141
WIRE OR CABLE STRINGING DEVICE
Lionel Henry James Cook, Vancouver, British Columbia, and Jack Coblenz, North Vancouver, British Columbia, Canada, assignors of one-half to Ingledow Kidd & Associates Limited, Vancouver, British Columbia, Canada, a Canadian company
Filed Jan. 2, 1964, Ser. No. 335,031
Claims priority, application Canada, Oct. 11, 1963, 886,497
9 Claims. (Cl. 242—129)

This invention relates to a device for stringing wire or cable or rope and, in particular, to a cage for supporting a reel of wire or the like adapted to be detachably connected to a helicopter and being capable of stringing the wire or cable or rope over rugged and inaccessible terrain.

In the past, the stringing of wire or cable over swampy, mountainous and snow covered areas has been exceedingly difficult. Often it has been impossible for the wire to be strung from a truck or by hand and, as will be appreciated, it is therefore advantageous to string the wire or cable from airplanes or helicopters.

Previous devices designed to string wire or cable from airplanes or helicopters have not been completely satisfactory. For instance, many of the known aerial devices have formed permanent and integral parts of the aircraft, thereby restricting the use of the latter to such stringing uses. Obviously, this ties up equipment unnecessarily.

Other aerial wire stringers have required weights attached to the device or suspended therefrom in order to prevent the device from swinging or twisting during flight. Moreover, some known aerial wire stringers have required the wire to be wound upon a special reel in order to function correctly, thereby adding to the cost of the project.

Accordingly, the object of the present invention is to overcome the above disadvantages by providing a novel aerial wire or cable or rope stringer adapted to be connected to a helicopter-hitch and which device is of simple and inexpensive construction and which facilitates the unreeling of wire or cable from the air thereby to permit either the suspension of electric power or telephone lines on pylons or the like or the ground laying of such wires or cables or ropes.

According to the present invention a reel cage for the aerial stringing of wire or cable or rope is adapted to be detachably secured to a helicopter and includes a base and a detachably connected vertically projecting spindle thereon, both said base and said spindle serving as the mounting for a conventional bored pre-wound reel of wire or cable or rope the spindle providing a rotational axis for the reel rotatable means on said base adapted to be in frictional contact with the lower end of said reel whereby excessive rotational speed of said reel is inhibited during unreeling operations; a first frame secured to and extending outwardly from the spindle adjacent its upper end; and a second frame pivotally mounted on said first frame and means interconnecting the first and second frames to bias said second frame into frictional contact with said wire or the like on the reel thereby inhibiting snarling of the wire or cable or rope during unreeling operations.

Figure 2:
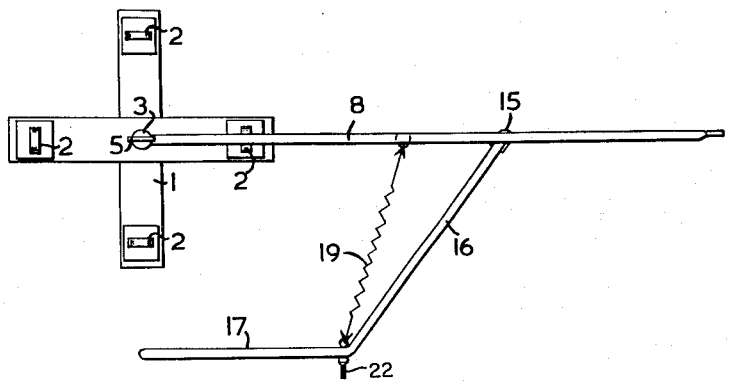
Figure 3:
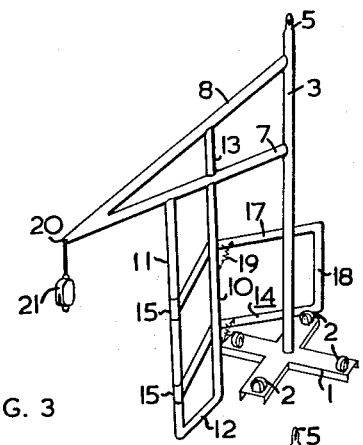
Figure 4:
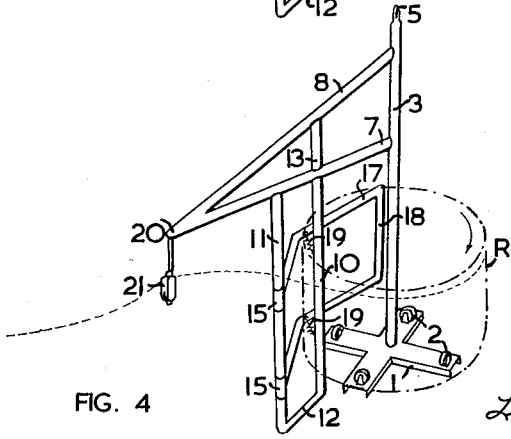

The invention is illustrated by way of example, in the accompanying drawings in which:

FIGURE 1 is an elevation of the wire stringing device;
FIGURE 2 is a plan of FIGURE 1;
FIGURES 3 and 4 are perspective views; and
FIGURE 5 is the diagrammatic illustration showing the device mounted on a helicopter.

Figure 5:
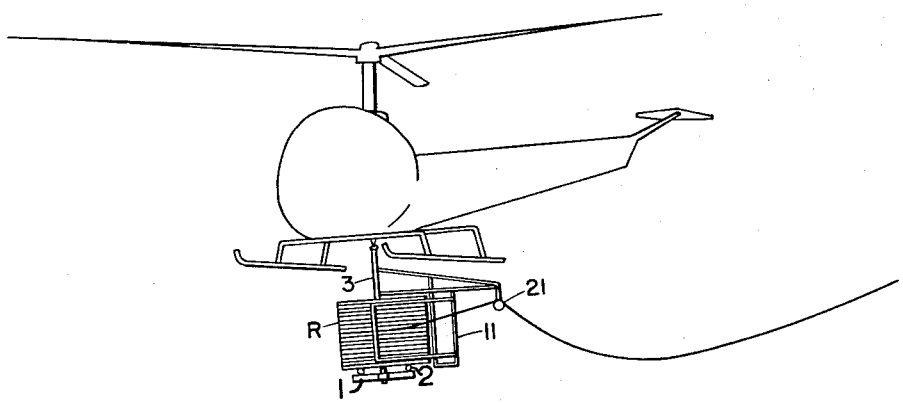

Referring to the drawings, the wire stringing reel cage is constituted by a cruciform base 1, each arm of which is provided with a caster 2 (preferably rubber-tired) mounted on its upper surface adjacent its face terminal end, said base being adapted to support a reel of wire R (see FIGURES 4 and 5). Projecting upwardly from substantially the centre of the base 1 is a detachable reel spindle 3, the lower end of which is adapted to be located, with respect to said base 1, by means of a bolt 4 (see FIGURE 1) passing through said base and the lower end of said spindle 3. The upper end of the spindle 3 is preferably flattened, as at 5, and is provided with an aperture 6 for the attachment of a sling or choke cable which is, in turn, attached to the helicopter hitch.

A first frame secured to the spindle comprises a first gantry arm 7, normal to the spindle 3, secured at one end thereof to the latter and projecting normal therefrom and a second gantry arm 8 angularly disposed with respect to the arm 7 connects the other or outer end of arm 7 to the spindle 3 adjacent the flattened portion 5.

A second U-shaped frame, indicated generally at 9 is constituted by a pair of tubular members 10 and 11 connected at their upper ends to gantry arm 7 and interconnected at their lower ends by a horizontal member 12 and depends from said gantry arm 7 substantially midway along the length of the latter, each member 10 and 11 being spaced from and substantially parallel to the spindle 3. A vertical cross-brace 13 extends between, and is connected to, the gantry arms 7, 8.

A reel follower or retainer frame, indicated generally at 14, is pivotally mounted at 15 to tubular member 11. The follower frame 14 is constituted by at least one but preferably a pair of spaced horizontal arms 16 each having a portion 17 of its length angulated with respect to the remainder of its length, the extremities of said portions 17 being interconnected by a vertical portion 18. The follower frame 14 is biased towards the reel spindle 3 by means of a pair of tension springs 19 each secured, at one end thereof, to tubular member 10 and, at the other end thereof, to an associated portion 17 of the horizontal arms 16. The tension springs 19 may be adjusted by tightening or loosening eye bolts 22 which are attached to arms 17.

The junction of the two gantry arms 7, 8 serves as a shackle mounting 20 for a pulley block 21 through which the wire or cable or rope is threaded as it is paid off from the reel.

In operation, a pre-wound reel R of wire or cable or rope is placed coaxially upon the base 1 where it is supported by the casters 2. The skeleton cage, constituted by the remainder of the device, is then placed in position by inserting the lower end of the spindle 3 through the bore of the reel R whereby the lower end of said spindle can be detachably secured, by means of bolt 4, to the base 1. In this position the portions 17 of the reel follower are urged into frictional contact with the wire on the reel R by means of the springs 19, the free end of the wire or cable or rope having been threaded through the pulley block 21.

The upper end of the spindle 3, which provides a rotational axis for the reel, is then connected to the normal sling hook or hitch projecting from the belly of the helicopter by means of a choke cable (not shown). The free end of the wire or cable or rope is secured to the structure or ground position, as the case may be.

The helicopter is flown at speeds up to 50 m.p.h. over the right-of-way and directly over the cross-arms of the pylon (if the line is to be suspended) or where the wire or cable or rope is to be laid on the ground. Accordingly, as the helicopter flies in a forward direction, the reel R of wire or cable will rotate on the spindle 3 and, hence, said wire or cable will unwind from the reel. Inasmuch as the lower end of the reel R abuts the rubber tired casters 2, the weight of said reel R provides sufficient friction to prevent the reel from spinning at an excessive rotational speed and the reel follower 14, due to its frictional contact with the wound wire, prevents the wire or cable or rope from what is termed in the art as "caging" i.e. snarling or falling out from its pre-wound position on the reel.

The passage of the wire or cable or rope through pulley block 21 additionally ensures that no snarling occurs, as said pulley block 21 ensures a constant take-off point in relation to the reel R.

It should be noted that this latter feature ensures that the direction of pull in relation to the reel R remains constant even though the helicopter may change its course of travel sideways or even rearward, as the guide arm (constituted by the gantry arms 7 and 8 and pulley 21) would automatically swing towards the direction that the wire or cable or rope is pulled, regardless of the direction of travel of the helicopter.

If required, the wire stringing reel cage can be jettisoned, as a unit, by the pilot in an emergency.

As will also be appreciated, the wire stringing reel cage can accommodate reels of varying dimensions, these being set by the type and quantity of wire or cable or rope to be strung, this in turn being set by the capacity of the helicopter.

We claim:

1. A reel cage for the aerial stringing of wire or the like comprising a spindle adapted to be suspended at its upper end from a helicopter to provide a rotational axis for a conventional board pre-wound reel of wire or the like; a base detachably secured to the lower end of said spindle for supporting said reel; rotatable means on said base to frictionally contact said reel to inhibit excessive rotational speed thereof during an unreeling operation; a first frame secured to and extending outwardly from said spindle adjacent its upper end; a second frame pivotally mounted on said first frame; and means interconnecting said first and second frames to bias said second frame into frictional engagement with said wire or the like on the reel to inhibit snarling thereof during an unreeling operation.

2. A reel cage according to claim 1 wherein said base is of cruciform configuration having a plurality of arms thereon, said rotatable means comprising a plurality of rubber-tired casters each of which is mounted on and projecting upwardly from each arm of said base.

3. A device according to claim 1 wherein the upper suspended end of said spindle is flattened and provided with an aperture adapted to receive a sling hook or shackle projecting from said helicopter whereby said cage is detachably connected to said helicopter.

4. A reel cage according to claim 1 wherein said first frame includes at least a first gantry arm secured, at one end thereof, to the spindle and projecting normal therefrom above said reel; and at least one substantially vertical member connected to and depending from said first gantry arm spaced from and parallel with the spindle, the second frame being pivotally secured to said vertical member; and wherein the biasing means interconnecting the first and second frames comprises at least one tension spring.

5. A reel cage according to claim 4 wherein said first frame includes a second gantry arm interconnecting the other end of the first gantry arm to the spindle adjacent its upper suspended end.

6. A reel cage according to claim 5 including a pulley block mounted on the other ends of said first and second gantry arms for paying out the wire as it is unwound from said reel.

7. A reel cage according to claim 4 wherein said first frame includes a second substantially vertical member depending from said first gantry arm and being spaced inwardly from and parallel with said first substantially vertical member, said tension spring being connected at one end to said second frame and at its other end to the second vertical member.

8. A reel cage according to claim 4 wherein said second frame includes at least one substantially horizontal member pivotally secured at one end thereof to said vertical member, and spaced below said first gantry arm, said horizontal member having a portion of its length angulated with respect to the remainder of its length and being maintained in frictional engagement with said wire on said reel by means of said tension spring.

9. A reel cage according to claim 4 wherein said second frame includes a pair of parallel and substantially horizontal members each pivotally mounted, at one end thereof, to said vertical member, and spaced below said first gantry arm; each said horizontal member having a portion of its length angulated with respect to the remainder of its length and a vertically disposed portion connecting together the other ends of the horizontal members, said portion being maintained in said frictional engagement with said wire or the like on said reel by means of said tension spring.

References Cited by the Examiner

UNITED STATES PATENTS

| | | | |
|---|---|---|---|
| 2,441,639 | 5/1948 | Larner | 242—128 |
| 2,950,876 | 8/1960 | McLoughlin | 242—128 |
| 3,073,545 | 1/1963 | Frate et al. | 242—128 |

STANLEY N. GILREATH, *Primary Examiner.*

M. STEIN, *Examiner.*

L. D. CHRISTIAN, *Assistant Examiner.*